US012119594B1

(12) United States Patent
Folk et al.

(10) Patent No.: US 12,119,594 B1
(45) Date of Patent: Oct. 15, 2024

(54) PLUG ASSEMBLY FOR POWER CORD

(71) Applicant: Eaton Intelligent Power Limited, Dublin (IE)

(72) Inventors: James C. Folk, Naples, FL (US); John D. Bean, Chicago, IL (US)

(73) Assignee: Eaton Intelligent Power Limited, Dublin (IE)

(*) Notice: Subject to any disclaimer, the term of this patent is extended or adjusted under 35 U.S.C. 154(b) by 0 days.

(21) Appl. No.: 18/344,593

(22) Filed: Jun. 29, 2023

Related U.S. Application Data

(63) Continuation of application No. 17/508,839, filed on Oct. 22, 2021, now abandoned.

(60) Provisional application No. 63/104,345, filed on Oct. 22, 2020.

(51) Int. Cl.
*H01R 25/00* (2006.01)
*H01R 103/00* (2006.01)

(52) U.S. Cl.
CPC ....... *H01R 25/003* (2013.01); *H01R 2103/00* (2013.01)

(58) Field of Classification Search
CPC .......................... H01R 25/003; H01R 2103/00
See application file for complete search history.

(56) References Cited

U.S. PATENT DOCUMENTS

| | | | | |
|---|---|---|---|---|
| 4,025,139 A * | 5/1977 | Martucci | H01R 13/648 | 439/106 |
| 6,644,986 B1 * | 11/2003 | Wilker, Sr. | H01R 25/006 | 439/106 |
| 7,057,108 B1 * | 6/2006 | Sodemann | H01R 13/7135 | 439/639 |
| 10,512,715 B2 * | 12/2019 | Crnkovich | H01R 13/6335 | |

* cited by examiner

*Primary Examiner* — Briggitte R. Hammond
(74) *Attorney, Agent, or Firm* — Baker Botts L.L.P.

(57) ABSTRACT

In one embodiment, a power plug assembly includes a plug housing, a set of electrical terminals configured to be inserted into a first set of electrical apertures of a first receptacle of an electrical outlet, a first ground terminal configured to be inserted into a first ground aperture of the first receptacle of the electrical outlet, a second ground terminal configured to be inserted into a second ground aperture of a second receptacle of the electrical outlet, a non-protruding portion configured to abut a second set of electrical apertures of the second receptacle of the electrical outlet, and a cord enveloping wires that extend from the plug housing via a side surface of the plug housing, and wherein the wires are coupled to the set of electrical terminals and the first and second ground terminals.

5 Claims, 16 Drawing Sheets

PLUG ASSEMBLY FOR POWER CORD

PRIORITY

This application is a continuation under 35 U.S.C. § 120 of U.S. patent application Ser. No. 17/508,839, filed 22 Oct. 2021, which claims the benefit under 35 U.S.C. § 119(e) of U.S. Provisional Patent Application No. 63/104,345, filed 22 Oct. 2020, which is incorporated herein by reference.

TECHNICAL FIELD

This disclosure generally relates to a plug assembly for a power cord.

BACKGROUND

A plug is the movable connector attached to an electrically operated device, and the socket is fixed on equipment or a building structure and connected to an energized electrical circuit. The plug is a male connector, often with protruding pins that match the openings and female contacts in a socket. Some plugs have female contacts that are used only for an earth ground connection. Some plugs have built-in fuses for safety. To reduce the risk of electric shock, plug and socket systems have safety features in addition to the recessed contacts of the energized socket. These may include plugs with insulated sleeves, recessed sockets, or automatic shutters to block socket apertures when a plug is removed.

SUMMARY OF PARTICULAR EMBODIMENTS

Healthcare patient safety continues to be paramount in our world today, as procedures and technology advance to support a longer life expectancy, and better-healthier being. A part of the technology development may comprise advancing of electrical patient safety. As an example and not by way of limitation, such advancing may comprise the revisions and updates to the NFPA-99 standards, the UL/AAMI standards, and other standards by a variety of regulatory and approving bodies. For electrical patient safety, a second (e.g., redundant) ground terminal may be required. Conventional ways of providing the second ground terminal may be deficient. For example, conventionally, the second ground terminal may be often connected to an auxiliary wire from the main plug and wire that carry the electrical terminals and primary ground terminal. Moreover, the second ground terminal may have to be plugged into to a patient equipment grounding point that is separate from the outlet in which the main plug is received. Connecting the auxiliary second ground wire, which is required in the standard UL2930, may be often an afterthought. For example, nurses today may refuse to connect the second "ground wire" which is required in the standard UL2930. Furthermore, the required patient equipment grounding point is installed in less than 2% of the health care facilities in the United States, making it impossible to comply with the use requirements. Therefore, health care facilities and clinicians may welcome a solution that simplifies the process of meeting the requirements for a redundant ground without having to handle multiple cords or connections to accomplish the task. In particular embodiments, a power plug assembly may be able to provide the necessary "redundant" ground as required by the health care standards and do so with a single plug assembly. The power plug assembly may overcome the technical and operational challenges associated with the application of the safety technology in healthcare. Although this disclosure describes a power plug assembly in a particular manner, this disclosure contemplates a power plug assembly in any suitable manner.

In particular embodiment, a power plug assembly may comprise a plug housing, a set of electrical terminals, a first ground terminal, one or more nonconductive terminals, and a second ground terminal. The set of electrical terminals may protrude from the plug housing and may be configured to be inserted into a set of electrical apertures of a first receptacle of an electrical outlet to establish an electrical connection. The first ground terminal may protrude from the plug housing and may be configured to be inserted into a first ground aperture of the first receptacle of the electrical outlet to establish a first ground connection. The one or more nonconductive terminals may protrude from the plug housing and may be configured to be inserted into one or more electrical apertures of a second receptacle of the electrical outlet. The second ground terminal may protrude from the plug housing and may be configured to be inserted into a second ground aperture of the second receptacle of the electrical outlet to establish a second ground connection.

In particular embodiments, a power plug assembly may comprise a plug housing, a set of electrical terminals, a first ground terminal, a second ground terminal, a non-protruding portion, and a cord. The plug housing may have a front surface, a back surface disposed opposite to the front surface, and one or more side surfaces connecting the front surface to the back surface. The set of electrical terminals may protrude from the front surface of the plug housing and may be configured to be inserted into a first set of electrical apertures of a first receptacle of an electrical outlet to establish an electrical connection. The first ground terminal may protrude from the front surface of the plug housing and may be configured to be inserted into a first ground aperture of the first receptacle of the electrical outlet to establish a first ground connection. The second ground terminal may protrude from the front surface of the plug housing and may be configured to be inserted into a second ground aperture of a second receptacle of the electrical outlet to establish a second ground connection. The non-protruding portion may be configured to abut a second set of electrical apertures of the second receptacle of the electrical outlet. The cord may envelope wires that extend from the plug housing. The cord may be attached to one of the one or more side surfaces of the plug housing.

In particular embodiments, a power plug assembly may comprise a set of electrical terminals, a first ground terminal, a second ground terminal, a first wire, a second wire, a third wire, a fourth wire, and a cord. The set of electrical terminals may be configured to be inserted into a first set of electrical apertures of a first receptacle of an electrical outlet to establish an electrical connection. The first ground terminal may be configured to be inserted into a first ground aperture of the first receptacle of the electrical outlet to establish a first ground connection. The second ground terminal may be configured to be inserted into a second ground aperture of a second receptacle of the electrical outlet to establish a second ground connection. The first wire and the second wire may be respectively coupled to the set of electrical terminals. The third wire and the fourth wire may be respectively coupled to the first ground terminal and the second ground terminal. The cord may envelope portions of the first wire, the second wire, the third wire, and the fourth wire outside of a plug housing of the power plug assembly.

In particular embodiments, the first wire, the second wire, and the third wire may be 12 gauge wires and the fourth wire may be a 10 gauge wire.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

DESCRIPTION OF EXAMPLE EMBODIMENTS

Figure 1:
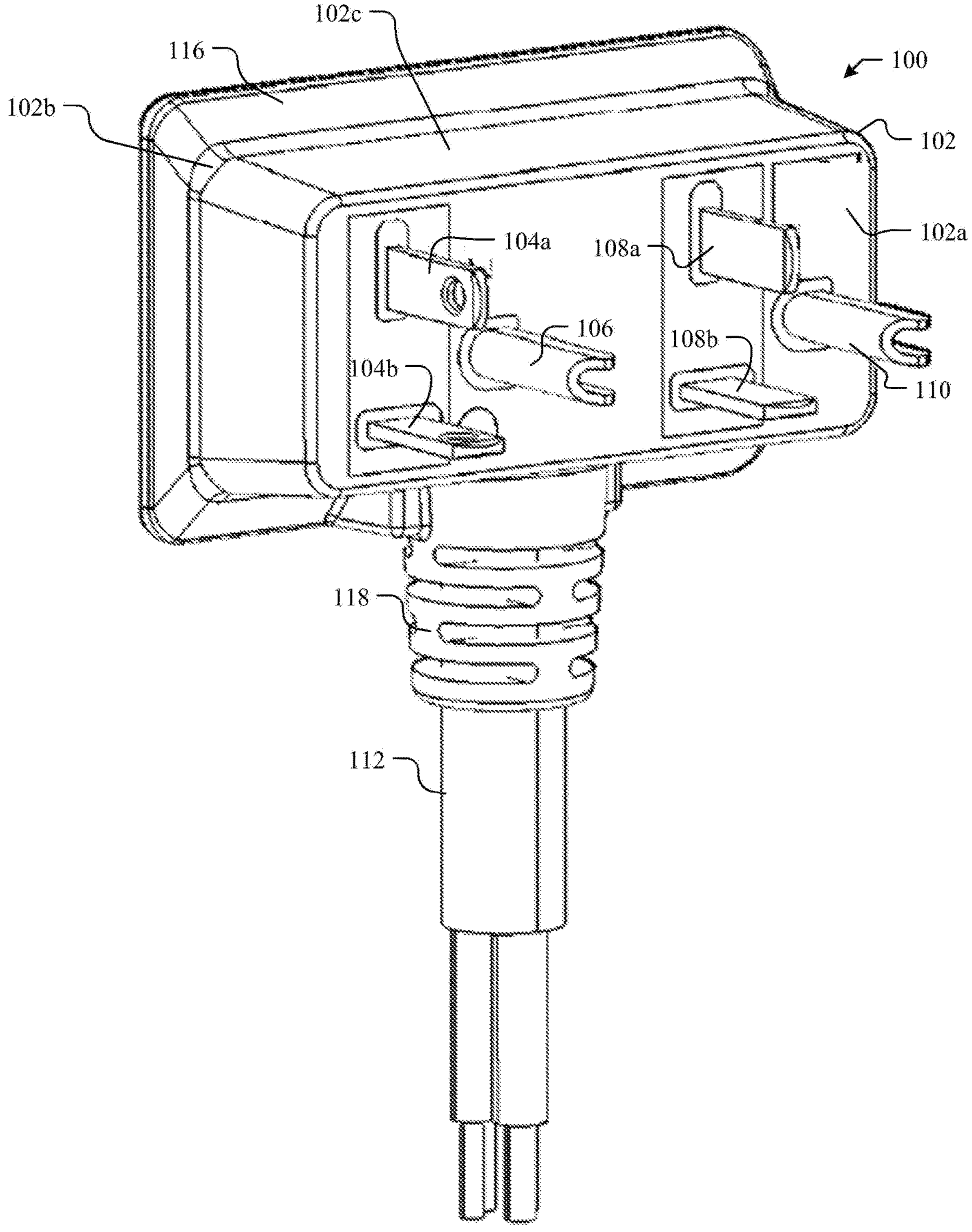
FIG. 1 illustrates an example front perspective view of a power plug assembly according to a first embodiment of the present disclosure.

Healthcare patient safety continues to be paramount in our world today, as procedures and technology advance to support a longer life expectancy, and better-healthier being. A part of the technology development may comprise advancing of electrical patient safety. As an example and not by way of limitation, such advancing may comprise the revisions and updates to the NFPA-99 standards, the UL/AAMI standards, and other standards by a variety of regulatory and approving bodies. For electrical patient safety, a second (e.g., redundant) ground terminal may be required. Conventional ways of providing the second ground terminal may be deficient. For example, conventionally, the second ground terminal may be often connected to an auxiliary wire from the main plug and wire that carry the electrical terminals and primary ground terminal. Moreover, the second ground terminal may have to be plugged into to a patient equipment grounding point that is separate from the outlet in which the main plug is received. Connecting the auxiliary second ground wire, which is required in the standard UL2930, may be often an afterthought. For example, nurses today may refuse to connect the second "ground wire" which is required in the standard UL2930. Furthermore, the required patient equipment grounding point is installed in less than 2% of the health care facilities in the United States, making it impossible to comply with the use requirements. Therefore, health care facilities and clinicians may welcome a solution that simplifies the process of meeting the requirements for a redundant ground without having to handle multiple cords or connections to accomplish the task. In particular embodiments, a power plug assembly may be able to provide the necessary "redundant" ground as required by the health care standards and do so with a single plug assembly. The power plug assembly may overcome the technical and operational challenges associated with the application of the safety technology in healthcare. Although this disclosure describes a power plug assembly in a particular manner, this disclosure contemplates a power plug assembly in any suitable manner.

FIGS. 1-7 illustrate a first embodiment of a power plug assembly 100. In particular embodiment, a power plug assembly 100 may comprise a plug housing 102, a set of electrical terminals 104, a first ground terminal 106, one or more nonconductive terminals 108, and a second ground terminal 110. The set of electrical terminals 104 may protrude from the plug housing 102 and may be configured to be inserted into a set of electrical apertures of a first receptacle of an electrical outlet to establish an electrical connection. The first ground terminal 106 may protrude from the plug housing 102 and may be configured to be inserted into a first ground aperture of the first receptacle of the electrical outlet to establish a first ground connection. The one or more nonconductive terminals 108 may protrude from the plug housing 102 and may be configured to be inserted into one or more electrical apertures of a second receptacle of the electrical outlet. The second ground terminal 110 may protrude from the plug housing 102 and may be configured to be inserted into a second ground aperture of the second receptacle of the electrical outlet to establish a second ground connection.

In particular embodiments, the electrical outlet into which the power plug assembly 100 is configured to be inserted may be a duplex electrical outlet. The power plug assembly 100 may be configured to be securely received in any other electrical outlet having at least two adjacent receptacles. As an example and not by way of limitation, the power plug assembly 100 may be used as an attachment plug for a power strip or other movable power supply connection for cord-and-plug connected devices.

Figure 2:
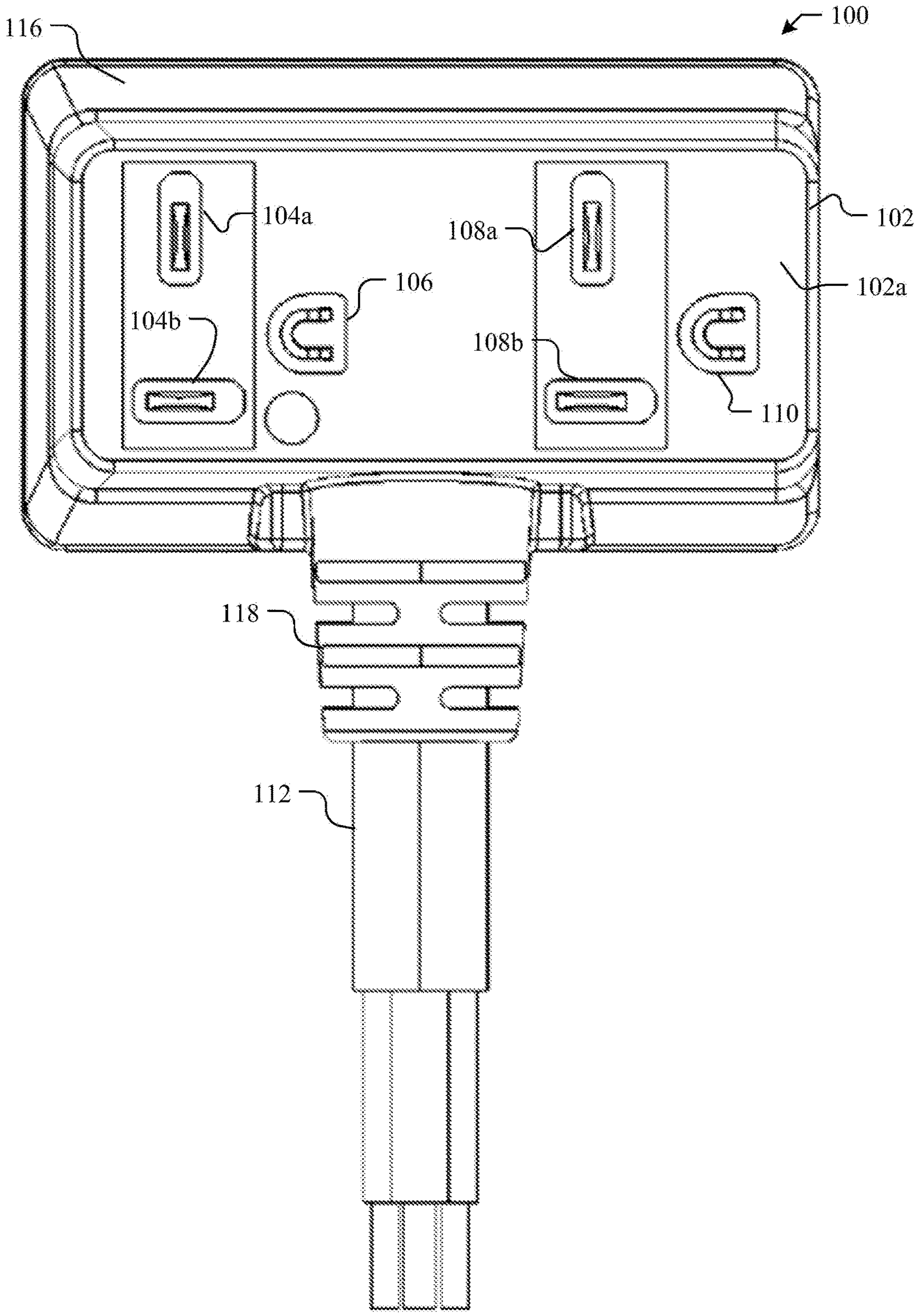
FIG. 2 illustrates an example front view of the power plug assembly of FIG. 1.
Figure 3:
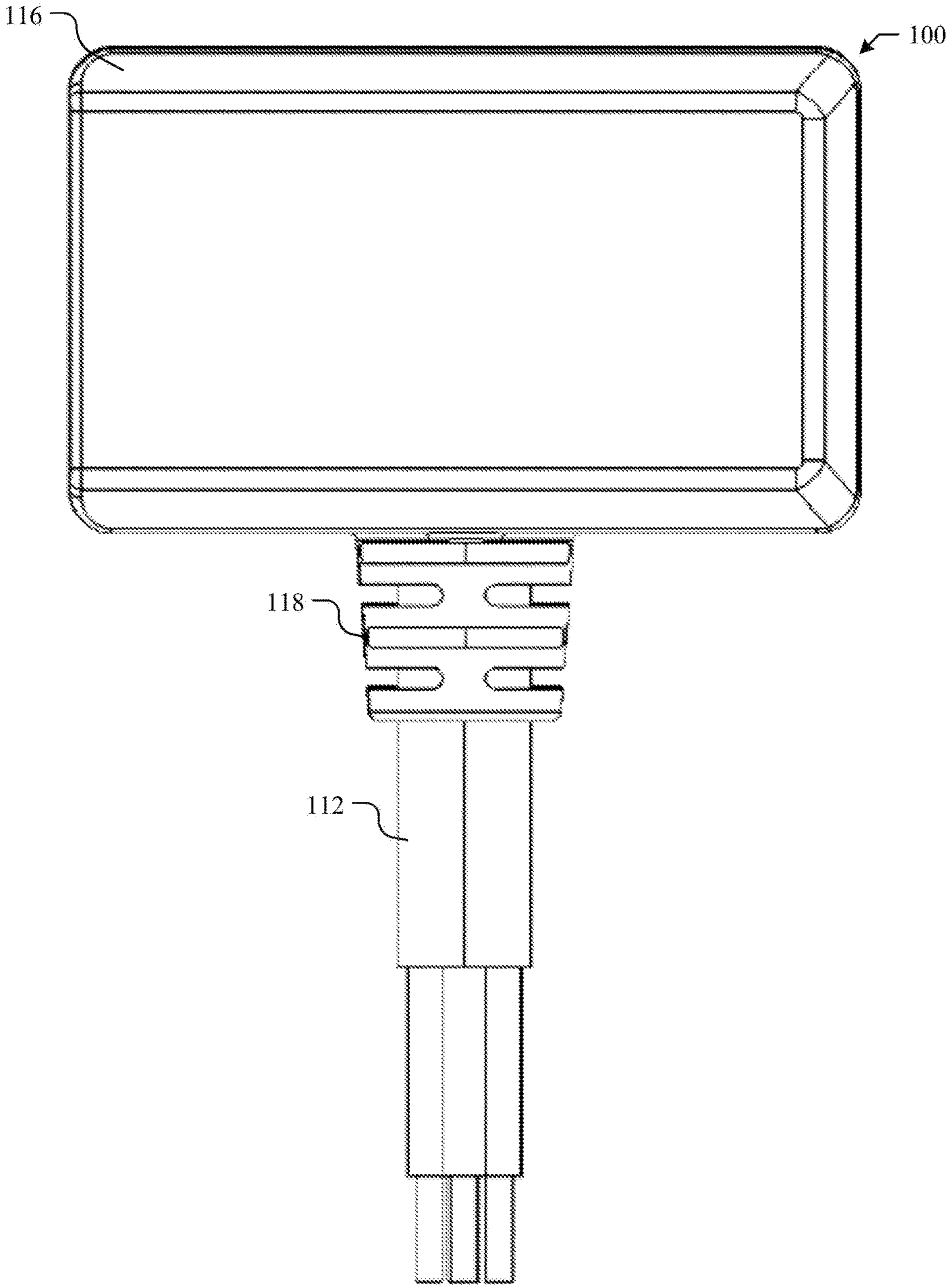
FIG. 3 illustrates an example rear view of the power plug assembly of FIG. 1.
Figure 4:
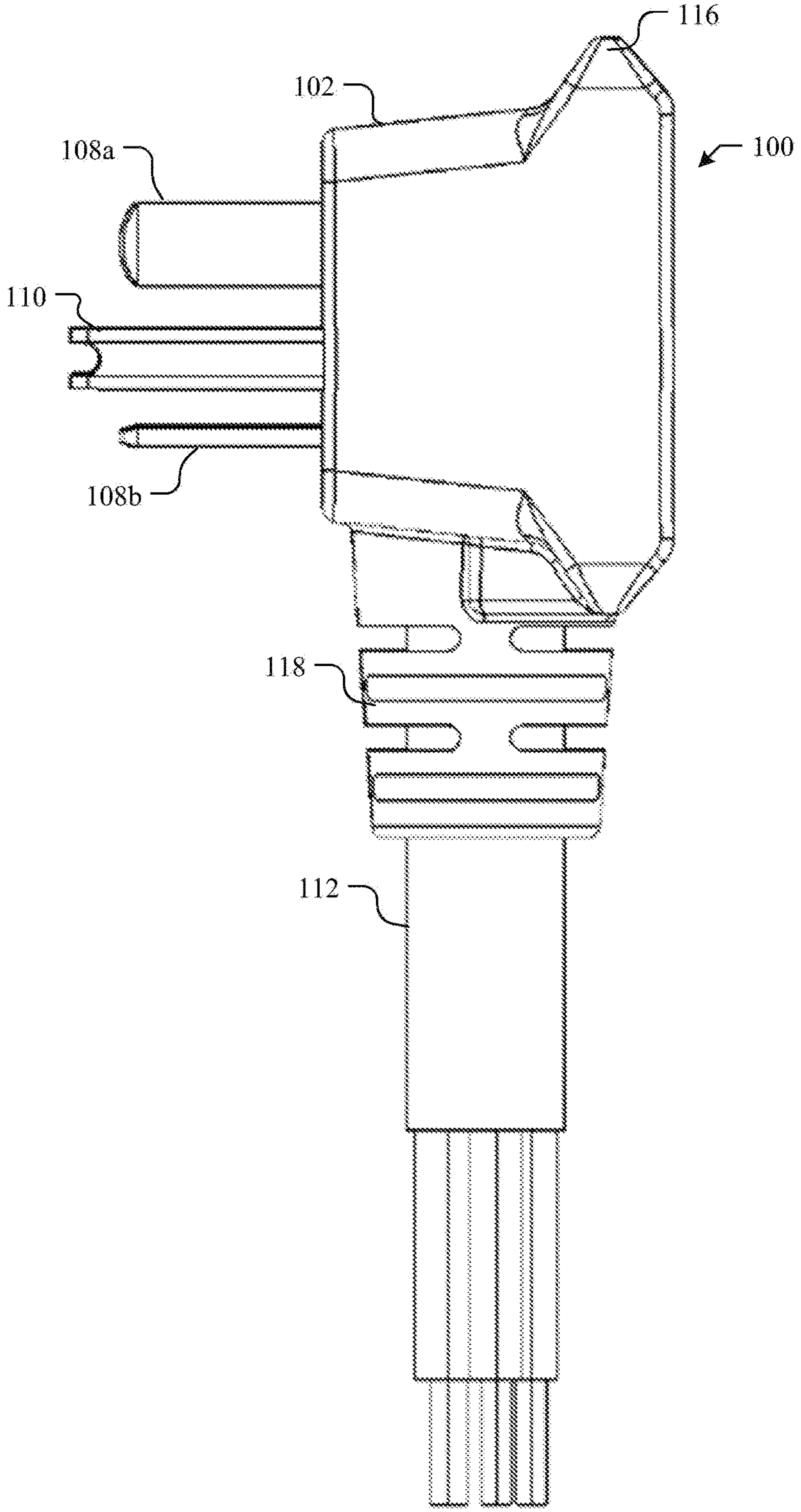
FIG. 4 illustrates an example first side view of the power plug assembly of FIG. 1.
Figure 5:
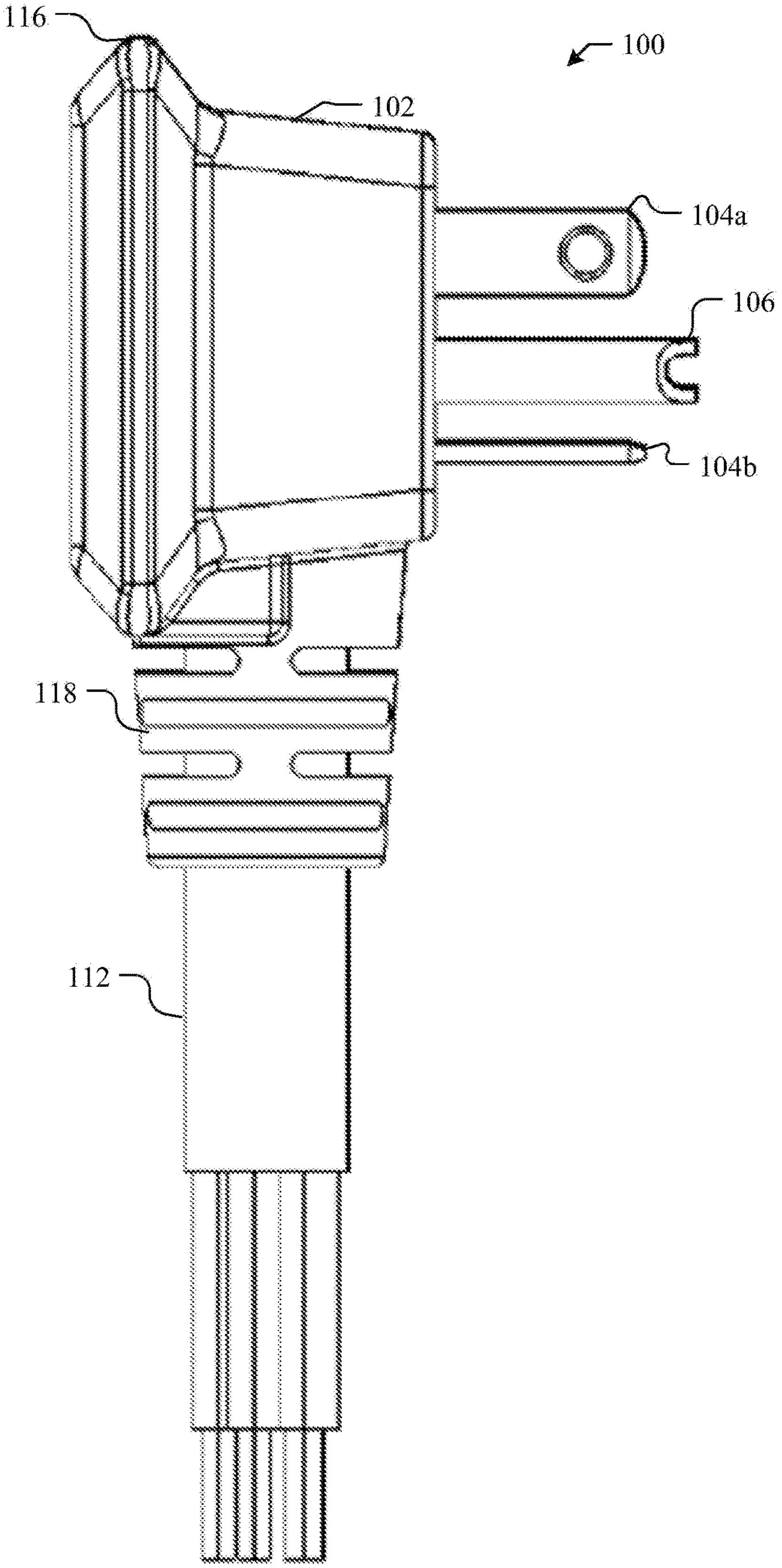
FIG. 5 illustrates an example second side view of the power plug assembly of FIG. 1.
Figure 6:
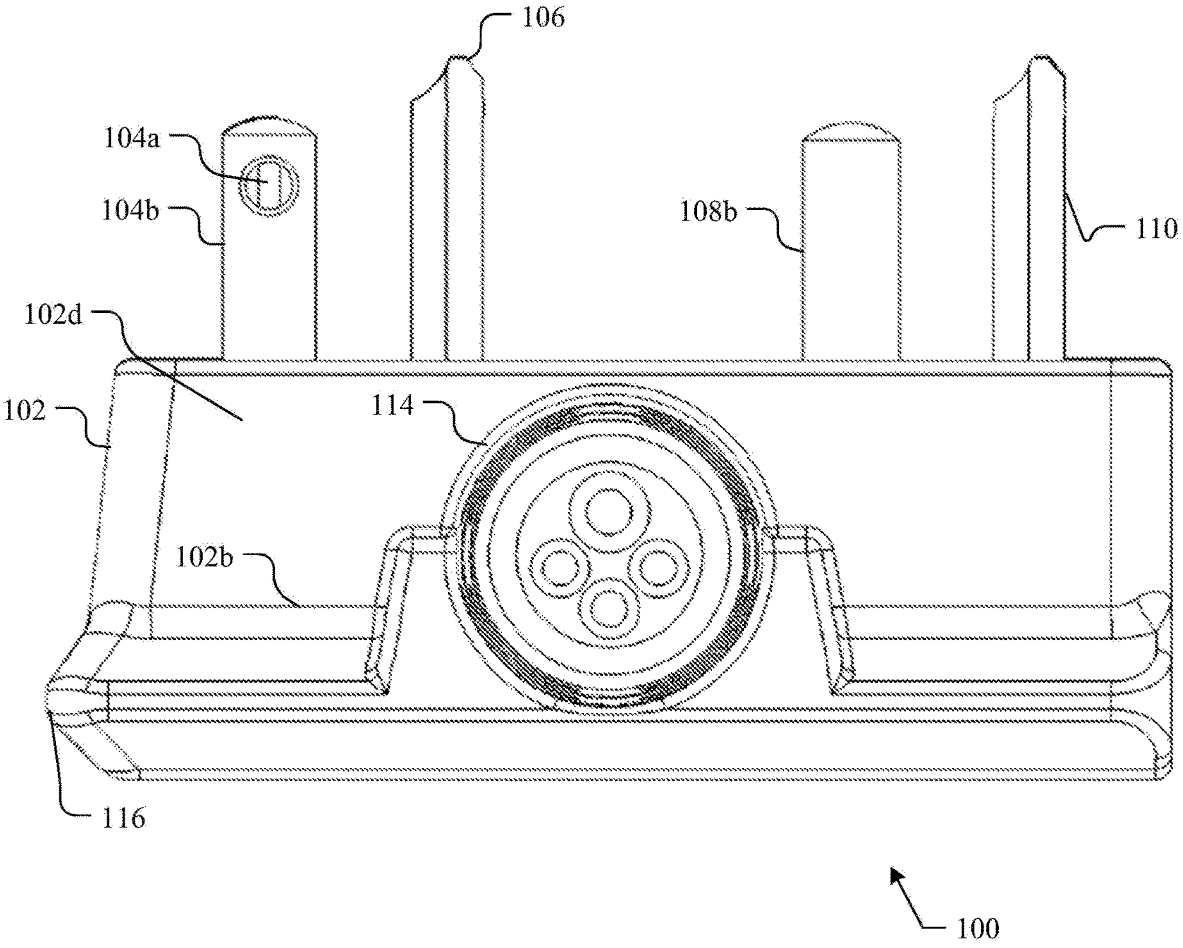
FIG. 6 illustrates an example bottom view of the power plug assembly of FIG. 1.
Figure 7:
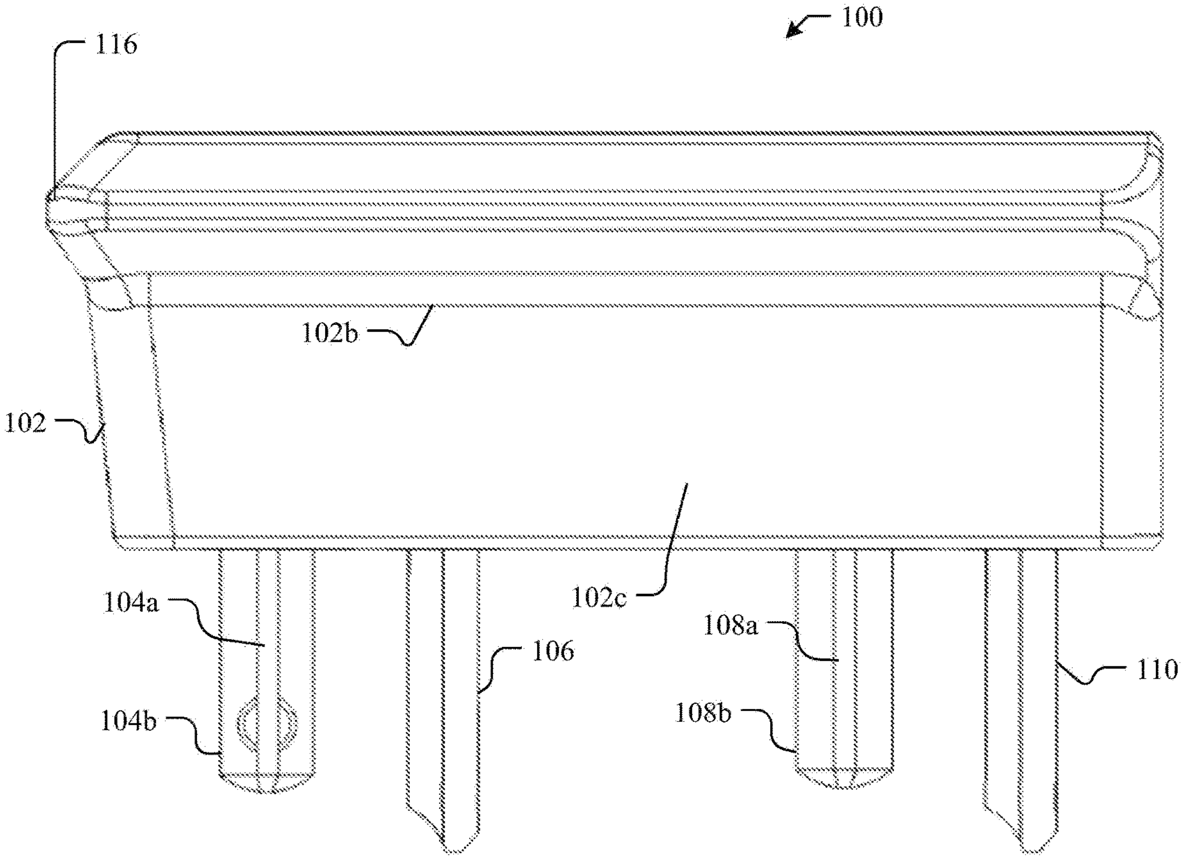
FIG. 7 illustrates an example top view of the power plug assembly of FIG. 1.

FIG. 1 illustrates an example front perspective view of a power plug assembly according to a first embodiment of the present disclosure. FIG. 2 illustrates an example front view of the power plug assembly of FIG. 1. FIG. 3 illustrates an example rear view of the power plug assembly of FIG. 1. FIG. 4 illustrates an example first side view of the power plug assembly of FIG. 1. FIG. 5 illustrates an example second side view of the power plug assembly of FIG. 1. FIG. 6 illustrates an example bottom view of the power plug assembly of FIG. 1. FIG. 7 illustrates an example top view of the power plug assembly of FIG. 1.

In particular embodiments, the power plug assembly 100 may comprise a plug housing 102 and a plurality of terminals. The plug housing 102 may comprise a first side 102*a*, a second side 102*b* opposite to the first side 102*a*, a third side 102*c*, and a fourth side 102*d* opposite to the third side 102*d*. The plurality of terminals may comprise a set of electrical terminals 104, a first ground terminal 106, one or more nonconductive (dummy) terminals 108, and a second ground terminal 110. In particular embodiments, the set of electrical terminals 104, the first ground terminal 106, the one or more nonconductive terminals 108, and the second ground terminal 110 may protrude through apertures in the first side 102*a*, such that each of the terminals protrudes from the first side 102*a*.

In particular embodiments, the set of electrical terminals 104 may comprise two metal conductive blades or prongs corresponding to a hot terminal and a neutral terminal. The first ground terminal 106 may comprise a metal conductive pin or prong for providing a ground connection. The set of electrical terminals 104 and the first ground terminal 106 may be configured to be inserted into apertures (not shown) in a first receptacle of an electrical outlet (e.g., wall outlet) so as to form a power plug for mechanically and electrically connecting to the first receptacle. Although this disclosure describes a ground terminal configured to be inserted into an aperture in a particular manner, this disclosure contemplates any suitable configuration for a ground terminal in any suitable manner. As an example and not by way of limitation, the first ground terminal 106 may be designed as a ground socket to receive a pin/prong fixed in an electrical outlet, which may be suitable for countries such as France, Belgium, Poland, etc.

In particular embodiments, the one or more nonconductive terminals 108 may comprise two blades or prongs formed of an electrically non-conductive material, for example plastic. The nonconductive terminals 108 and the second ground terminal 110 may be configured to be inserted into apertures in a second receptacle of the electrical outlet. In particular embodiments, the first receptacle and the second receptacle may be adjacent to each other on the electrical outlet. In particular embodiments, the one or more nonconductive terminals 108 may comprise a first nonconductive terminal 108*a* configured to be mechanically secured in a hot socket (i.e., hot female contact) of the second receptable and a second nonconductive terminal 108*b* configured to be mechanically secured to a neutral socket (i.e., neutral female contact) of the second receptable. For example, the nonconductive terminals 108 may be shaped, dimensioned and/or oriented to match the apertures in the second receptacle of the electrical outlet corresponding to the hot and neutral female contacts of the second receptacle. As a result, the nonconductive terminals 108 may be securely received in the second receptacle, thereby providing an additional mechanical connection to the electrical outlet for improving retention of the power plug assembly in the electrical outlet.

In particular embodiments, the second ground terminal 110, like the first ground terminal 106, may also comprise a metal conductive pin or prong for providing a ground connection. Similarly, the second ground terminal 110 may be configured in any suitable manner. As an example and not by way of limitation, the second ground terminal 110 may be designed as a ground socket to receive a pin/prong fixed in an electrical outlet, which may be suitable for countries such as France, Belgium, Poland, etc. The inclusion of two ground terminals may provide a working ground terminal and a safety ground terminal in the same attachment plug. Accordingly, if the working ground terminal were to fail, the safety ground terminal may provide a backup (e.g., redundant or second) ground terminal in accordance with requirements of Underwriters Laboratories Inc. (UL) Standard UL 2930 for cord-and-plug-connected healthcare facility receptacle outlet assemblies. In some embodiments, the resistance of the mating connection of the first and second ground terminals to the receptacle may not exceed 0.01 Ohms.

In particular embodiments, the terminals in each of the set of electrical terminals 104 and the one or more nonconductive terminals 108 may be positioned with their longitudinal axes in parallel and oriented in the same direction. In the embodiment of FIGS. 1-7, one of the electrical terminals 104 may be oriented perpendicular to the other electrical terminal 104 when viewed along the longitudinal axis of either terminal and one of the nonconductive terminals 108 may be oriented perpendicular to the other nonconductive terminal 108 when viewed along the longitudinal axis of either terminal. For example, the electrical terminal 104*a* may be oriented perpendicular to the electrical terminal 104*b* when viewed along the longitudinal axis of either terminal and the nonconductive terminal 108*a* may be oriented perpendicular to the nonconductive terminal 108*b* when viewed along the longitudinal axis of either terminal. Thus, one of the electrical terminals 104 may have a width that extends along a first axis and the other of the electrical terminals 104 may have a width that extends along a second axis that is perpendicular to the first axis. For example, the electrical terminal 104*a* may have a width that extends along a first axis and the electrical terminal 104*b* may have a width that extends along a second axis that is perpendicular to the first axis. Similarly, one of the nonconductive terminals 108 may have a width that extends along a first axis and the other of the nonconductive terminals 108 may have a width that extends along a second axis that is perpendicular to the first axis. For example, the nonconductive terminal 108*a* may have a width that extends along a first axis and the nonconductive terminal 108*b* may have a width that extends along a second axis that is perpendicular to the first axis. Accordingly, the power plug assembly 100 of FIGS. 1-7 may be a 20 AMP plug.

Figure 8:
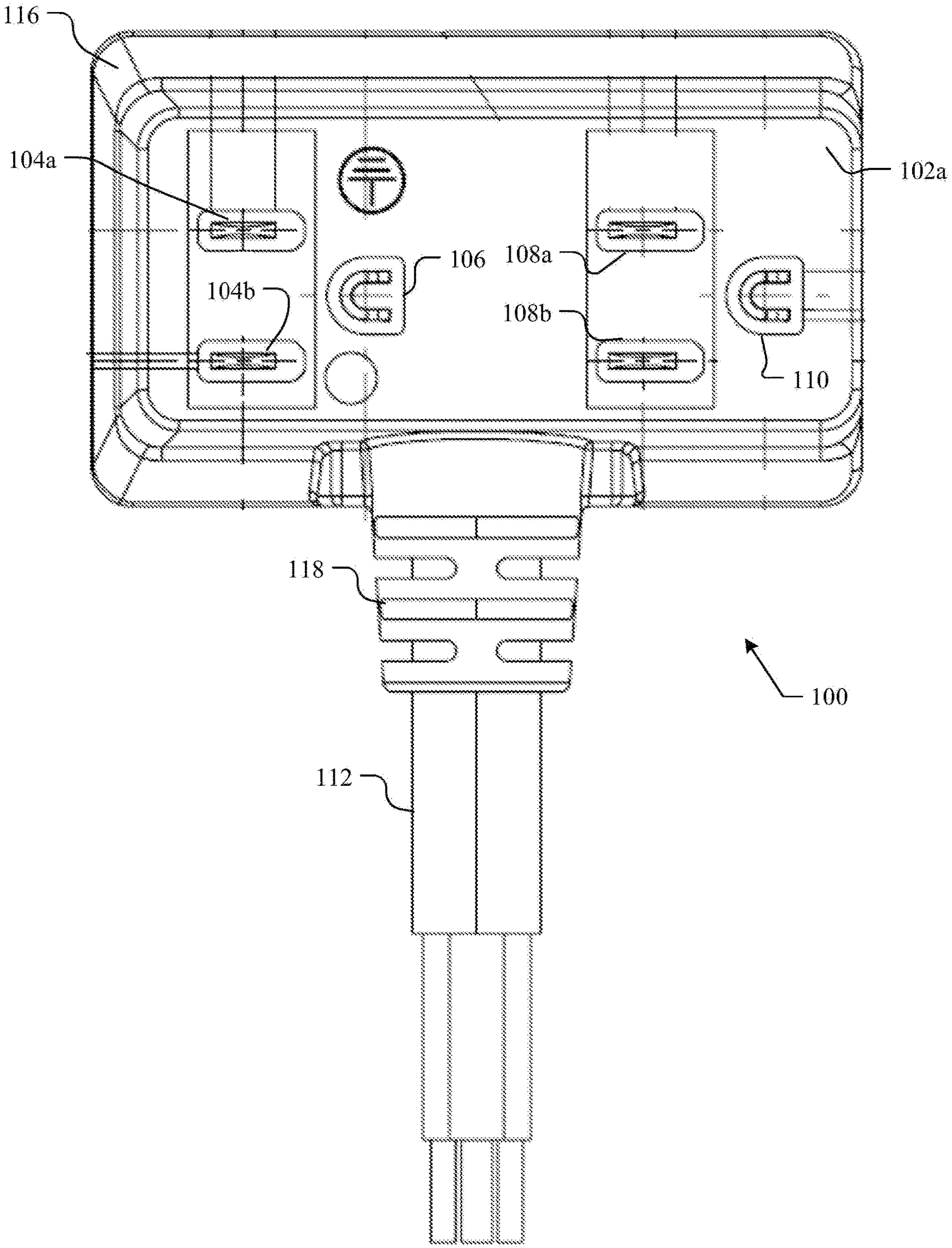
FIG. 8 illustrates an example front view of a power plug assembly according to a second embodiment of the present disclosure.
Figure 9:
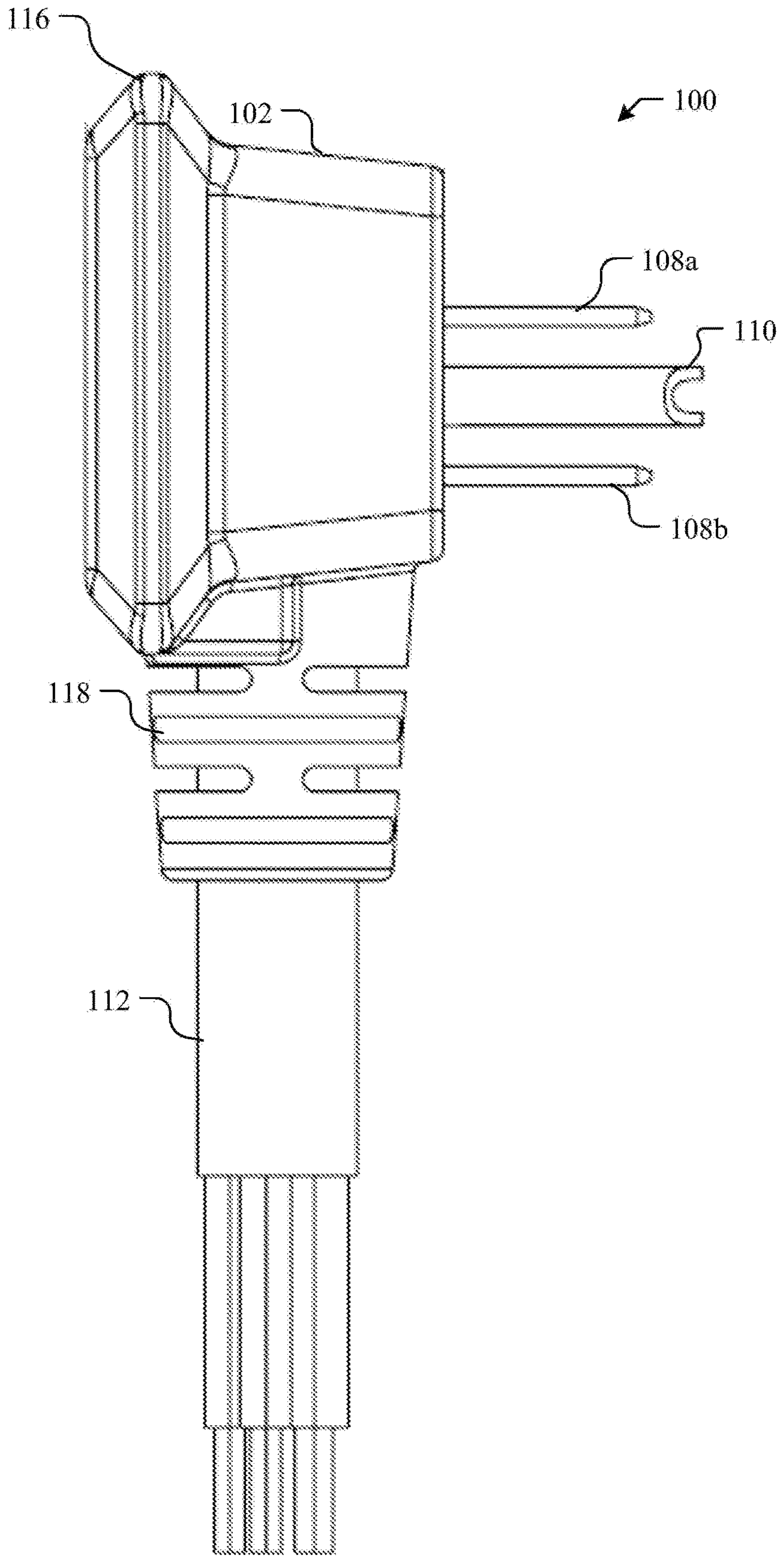
FIG. 9 illustrates an example side view of the power plug assembly of FIG. 8.
Figure 10:
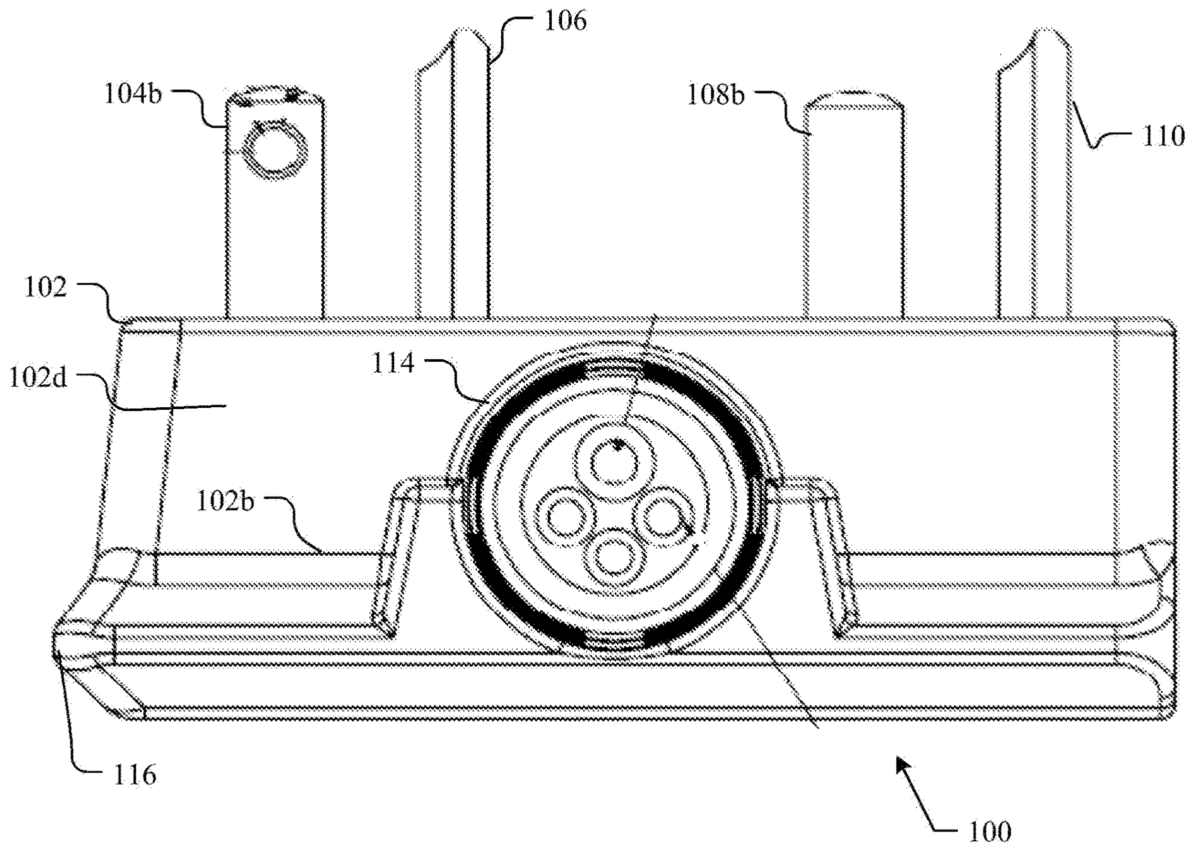
FIG. 10 illustrates an example bottom view of the power plug assembly of FIG. 8.

FIGS. 8-10 illustrate a second embodiment of a power plug assembly 100. FIG. 8 illustrates an example front view of a plug assembly according to a second embodiment of the present disclosure. FIG. 9 illustrates an example side view of the plug assembly of FIG. 8. FIG. 10 illustrates an example bottom view of the plug assembly of FIG. 8. In particular embodiments, the electrical outlet into which the power plug assembly 100 is configured to be inserted may be a duplex electrical outlet or any other electrical outlet having at least two adjacent receptacles.

In the embodiment of FIGS. 8-10, one of the electrical terminals 104 may be oriented parallel to the other electrical terminal 104 when viewed along the longitudinal axis of either terminal and one of the nonconductive terminals 108 may be oriented parallel to the other nonconductive terminal 108 when viewed along the longitudinal axis of either terminal. For example, the electrical terminal 104*a* may be oriented parallel to the electrical terminal 104*b* when viewed along the longitudinal axis of either terminal and the nonconductive terminal 108*a* may be oriented parallel to the nonconductive terminal 108*b* when viewed along the longitudinal axis of either terminal. Thus, one of the electrical terminals 104 may have a width that extends along a first axis and the other of the electrical terminals 104 may have a width that extends along a second axis that is parallel to the first axis. For example, the electrical terminal 104*a* may have a width that extends along a first axis and the electrical terminal 104*b* may have a width that extends along a second axis that is parallel to the first axis. Similarly, one of the nonconductive terminals 108 may have a width that extends along a first axis and the other of the nonconductive terminals 108 may have a width that extends along a second axis that is parallel to the first axis. For example, the nonconductive terminal 108*a* may have a width that extends along a first axis and the nonconductive terminal 108*b* may have a width that extends along a second axis that is parallel to the first axis. Accordingly, the power plug assembly 100 of FIGS. 8-10 may be a 15 AMP plug.

In both embodiments illustrated in FIGS. 1-7 and FIG. 8-10, terminal configurations and orientations may be in any suitable manner that is suitable for any suitable region. As an example and not by way of limitation, one of the terminals in the electrical terminals 104 or the nonconductive terminals 108 may be oriented parallel to the other terminal in the electrical terminals 104 or the nonconductive terminals 108 when viewed along the longitudinal axis of either terminal. As another example and not by way of limitation, the set of electrical terminals 104 and the nonconductive terminals 108 may each comprise two round prongs of the same size, which may be suitable for regions such as Europe, South America, etc. As another example and not by way of limitation, the set of electrical terminals 104 and the nonconductive terminals 108 may each comprise two round prongs of the different size, which may be suitable for Poland, Russia, etc. As another example and not by way of limitation, the set of electrical terminals 104 and the nonconductive terminals 108 may each comprise two cubic prongs of the same size, which may be suitable for United Kingdom, Ireland, Malta, Singapore, etc. As another example and not by way of limitation, the terminals in the set of electrical terminals 104 or the nonconductive terminals 108 may be oriented with an angle between 30 degrees and 90 degrees, which may be suitable for China, Australia, New Zealand, etc. As another example and not by way of limitation, the electrical terminals 104, the first ground terminal 106, the nonconductive terminals 108, and the second ground terminal 110 may all comprise same sized round prongs that are aligned along a line, which may be suitable for Italy and Chile.

In particular embodiments, the direction of the terminals may ensure that the power plug assembly 100 is not used in an incompatible outlet (e.g., receptacles of an incompatible outlet). In alternative embodiments, the terminals may have other arrangements that may be suitable for any suitable outlet.

In particular embodiments, the set of electrical terminals 104 and the first ground terminal 106 may form a first plug. The one or more nonconductive terminals 108 and the second ground terminal 110 may form a second plug. The first plug and the second plug may be aligned side by side along a lateral axis. Accordingly, the power plug assembly 100 may be suitable for electrical outlets comprising vertical sockets. In alternative embodiments, the set of electrical terminals 104 and the first ground terminal 106 may form a first plug. The one or more nonconductive terminals 108 and the second ground terminal 110 may form a second plug. The first plug may be above or below the second plug along a vertical axis. Accordingly, the power plug assembly 100 may be suitable for electrical outlets comprising horizontal sockets. Although this disclosure describes two plugs being formed by the terminals, the power plug assembly 100 may comprise any suitable number (more than two) of plugs being formed by the terminals. As an example and not by way of limitation, the power plug assembly 100 may have a first set of electrical terminals and a first ground terminal forming a first plug, a second set of electrical terminals and a second ground terminal forming a second plug, and a set of nonconductive terminals and a third ground terminal forming a third plug. Accordingly, the power plug assembly 100 may be inserted to an electrical outlet with three receptacles. Additionally, although this disclosure describes the two plugs formed by the terminals having particular positions (e.g., side by side) with respect to each other, this disclosure may contemplate the two plugs having any positions with respect to each other. For example, the first plug and the second plug may be along a diagonal axis with one being higher or lower than the other.

In particular embodiments, the power plug assembly 100 may further comprise a plurality of wires coupled to the set of electrical terminals 104 and the first ground terminal 108 and the second ground terminal 110. The power plug assembly 100 may also comprise a cord 112 containing the plurality of wires. The plug housing 102 may further comprise a conduit 114 through which the cord 112 extends. In particular embodiments, a first wire and a second wire may be respectively coupled to (e.g., in electrical communication with the neutral terminal, a third wire is coupled to (e.g., in electrical communication with) the set of electrical terminals 104. A third wire may be coupled to the first ground terminal 106. In particular embodiments, the first wire, the second wire, and the third wire may be 12 gauge wires. A fourth wire may be coupled to the second ground terminal 110. In particular embodiments, the fourth wire may be a 10 gauge wire. Each of the plurality of wires may be configured to be coupled to (e.g., or in electrical communication) with complementary circuitry in a device or other plug and may be surrounded by an insulative sleeve or member.

In particular embodiments, the cord 112 may extend from a side of the plug housing 102 that is between the first side 102*a* and a second side 102*b* opposite to the first side 102*a*. As an example and not by way of limitation, the conduit 114 (and therefore the cord 112) may extend from the fourth side 102*d* of the housing 102, such that the conduit 114 (and therefore the cord 112) extends from a side of the housing 102 that is between the first side 102*a* from which the terminals extend and the second side 102*b*, which is opposite to the first side 102*a*. When plugged in e.g., a wall outlet that is vertically oriented, and viewed from the rear of the power plug assembly 100, the cord 112 may come out of the side of the plug housing 102. This cord configuration may allow the cord 112 to apply a torque towards the object (e.g., a wall) in which the electrical outlet is positioned about an axis that is parallel to a plane of the object. Accordingly, this cord configuration may allow the cord 112 to apply a force adjacent to and parallel to the object (e.g., the wall) in which the electrical outlet is positioned, which may improve the plug retention by keeping the terminals well retained in the sockets of the outlet. This cord configuration may contrast configurations in which cords extend from the side opposite to the side from which the plugs extend because in those configurations the cord weight may apply an outward/downward force, which may cause the cord to self-remove from the electrical outlet. In particular embodiments, the cord 112 may further comprise a strain relief 118. Although this disclosure describes the cord extending from particular side of the power plug assembly, this disclosure contemplates the cord extending from any suitable side or part of the power plug assembly. For example, FIGS. 1-6 and FIGS. 8-10 illustrate that the cord 112 extends from a long side of plug housing 102. However, in alternative embodiments, the cord 112 may extend from any other side/part such as a short side, a corner, etc.

In particular embodiments, the plug housing 102 may further comprise a lip 116 (e.g., a pull lip) extending from at least one side thereof. As an example and not by way of limitation, the lip 116 may extend from the third side 102*c*. As another example and not by way of limitation, the lip 116 may extend from more than one side (e.g., one or more of the first, second, third, or fourth sides). Accordingly, the lip 116 may extend outwardly from the plug housing 102 and at least partially about a perimeter of the plug housing 102. As shown, a gap or space may be defined between the lip 116 and the first side 102*a* of the plug housing 102 from which the terminals extend. The lip 116 may be configured to assist the user in removing the power plug assembly 100 from an electrical outlet such that the user may not have to resort to pulling on the cord 112, which may be mechanically and electrically detrimental to the integrity of the power plug assembly 100. That is, the user may be able to position one or more fingers in the gap defined between the lip 116 and the first side 102*a* of the plug housing 102 such that the user may more easily remove the power plug assembly 100 from the electrical outlet. In the illustrated embodiment, the lip 116 may be integrally formed with the plug housing 102. In alternative embodiments, the lip 116 may be separately coupled (e.g., as a distinct component) to the plug housing 102. Further in other embodiments, other removal mechanisms (e.g., tabs, handles, flanges, etc.) configured to assist the user in removing the power plug assembly 100 from the electrical outlet may be integrally formed with or otherwise coupled to the plug housing 102.

In particular embodiments, the first side 102*a* may be substantially flat. In other words, the power plug assembly 100 may not require a rubber "boot" or accessory that typically provides liquid/moisture intrusion because these boots or accessories may prohibit the power plug assembly 100 from fully engaging in the socket, leaving it prone to falling out. Although this disclosure describes the plug housing comprising particular components in a particular manner, this disclosure contemplates the plug housing enclosing and/or comprising any additional suitable circuitry not specifically disclosed herein.

FIGS. 11-15 illustrate a third embodiment of a power plug assembly 100. In particular embodiments, a power plug assembly 100 may comprise a plug housing 102, a set of electrical terminals 104, a first ground terminal 106, a second ground terminal 110, a non-protruding portion 1102, and a cord 112. The plug housing 102 may have a front surface, a back surface disposed opposite to the front surface, and one or more side surfaces connecting the front surface to the back surface. The set of electrical terminals 104 may protrude from the front surface of the plug housing 102 and may be configured to be inserted into a first set of electrical apertures of a first receptacle of an electrical outlet to establish an electrical connection. The first ground terminal 106 may protrude from the front surface of the plug housing 102 and may be configured to be inserted into a first ground aperture of the first receptacle of the electrical outlet to establish a first ground connection. The second ground terminal 110 may protrude from the front surface of the plug housing 102 and may be configured to be inserted into a second ground aperture of a second receptacle of the electrical outlet to establish a second ground connection. The non-protruding portion 1102 may be configured to abut a second set of electrical apertures of the second receptacle of the electrical outlet. In particular embodiments, the cord 112 may envelope wires that extend from the plug housing 102. The cord may be attached to one of the one or more side surfaces of the plug housing 102.

Figure 11:
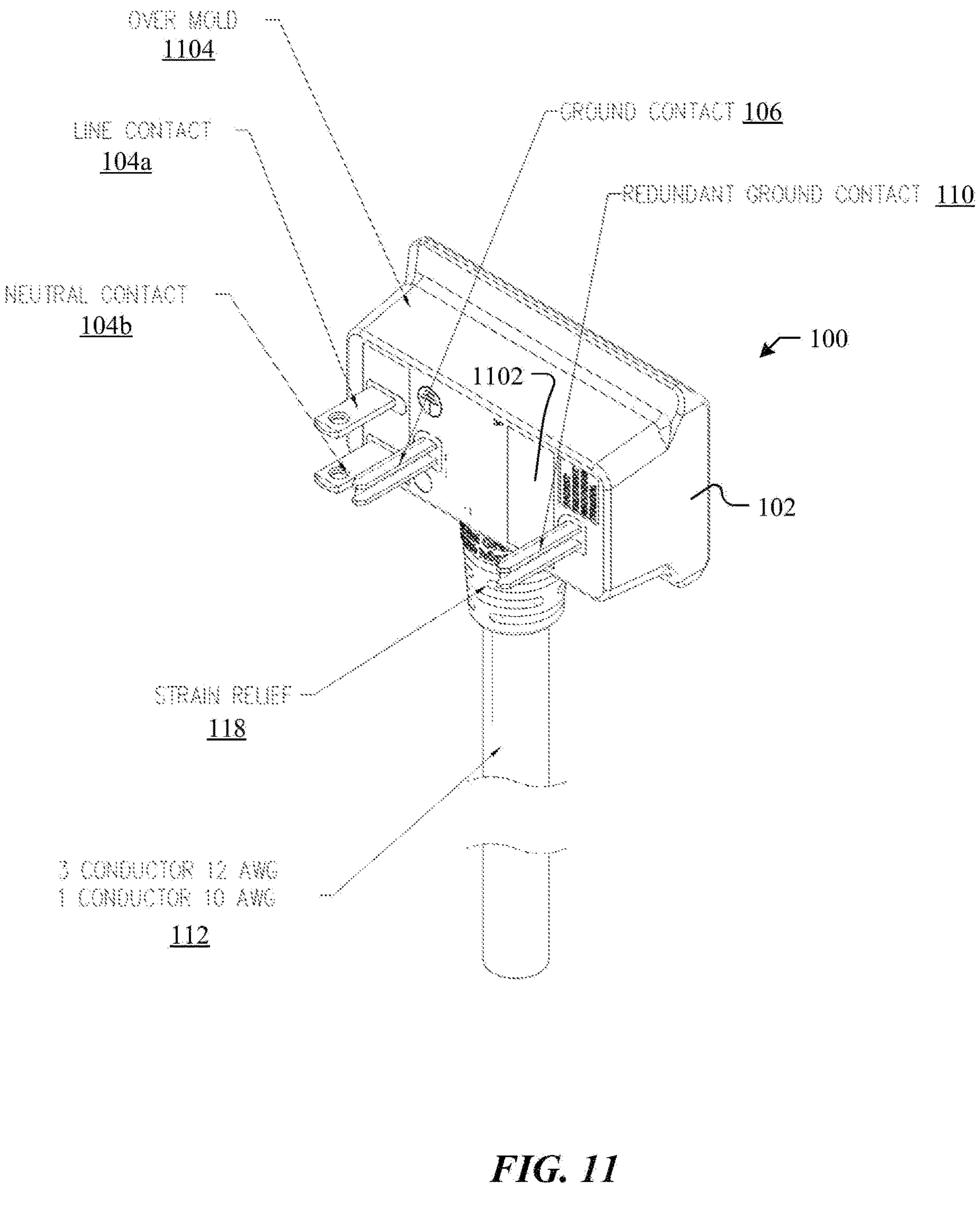
FIG. 11 illustrates an example front perspective view of a power plug assembly according to a third embodiment of the present disclosure
Figure 12:
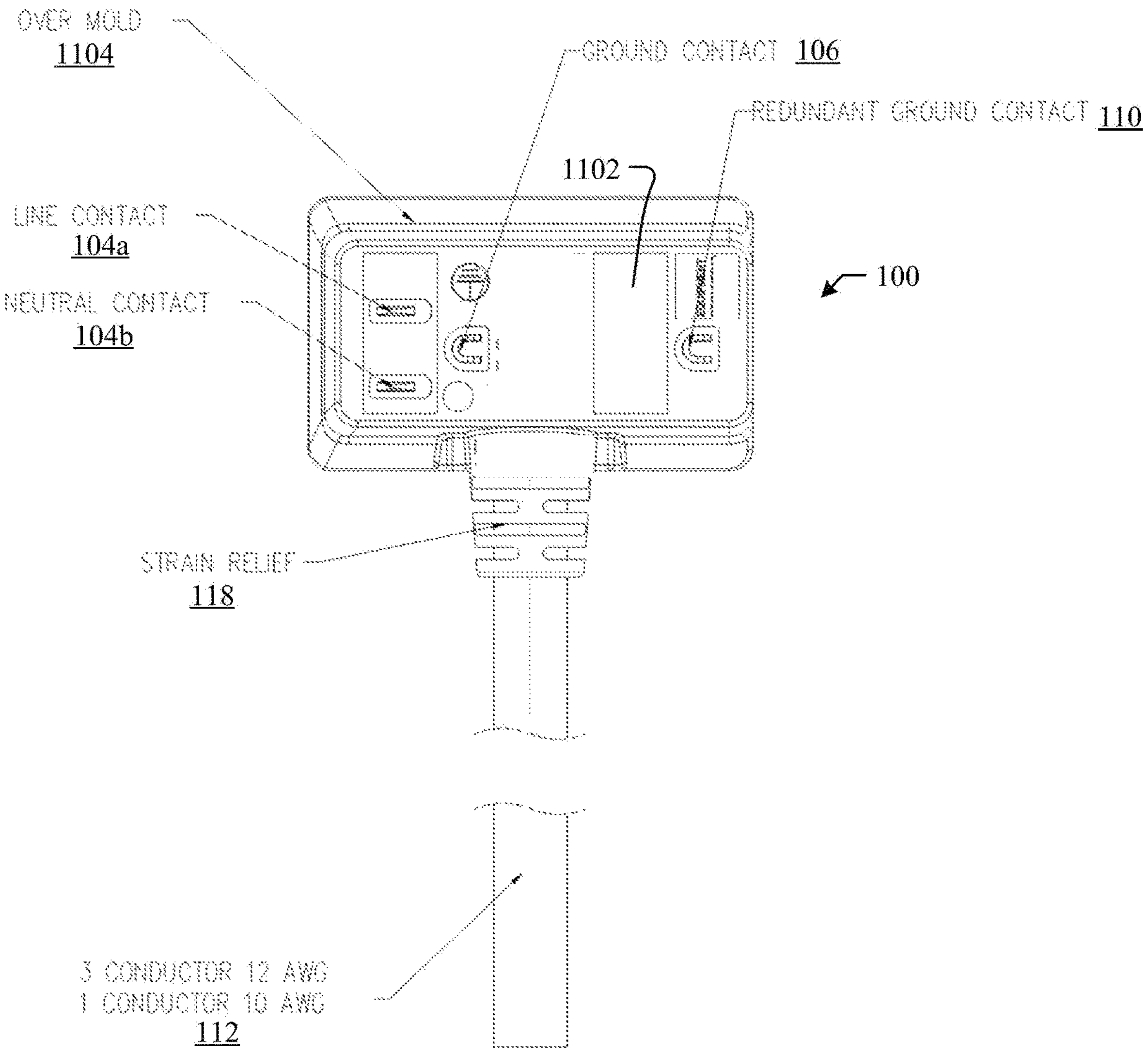
FIG. 12 illustrates an example front view of the power plug assembly of FIG. 11.

FIG. 11 illustrates an example front perspective view of a power plug assembly according to a third embodiment of the present disclosure. FIG. 12 illustrates an example front view of the power plug assembly of FIG. 11. The set of electrical terminals 104 are indicated as a line contact 104*a* (i.e., equivalent to the electrical terminal 104*a*) and a neutral contact 104*b* (i.e., equivalent to the electrical terminal 104*b*). The first ground terminal 106 is indicated as a ground contact 106. The second ground terminal 110 is indicated as a redundant ground contact 110. The front surface from which the set of electrical terminals 104, the first ground terminal 106, and the second ground terminal 110 protrude may be substantially flat. In particular embodiments, the direction of the terminals may ensure that the power plug assembly 100 is not used in an incompatible outlet (e.g., receptacles of an incompatible outlet). In alternative embodiments, the terminals may have other arrangements that may be suitable for any suitable outlet.

The plug housing 102 may further comprise an over mold 1104. In particular embodiments, the cord 112 may comprise a three-conductor size-12 wire and a single-conductor size-10 wire according to the American Wire Gauge (AWG) standard. The three-conductor indicates the wire may have two hot wires and one neutral wire. The single-conductor wire may be constructed of one copper wire, either stranded or solid core. Size-12 or size-10 indicates a 12-gauge or 10-gauge wire according to the AWG standard. The contacts may reduce resistance at connection and heating, fit better with hospital equipment/terminals, and have better retention. The single-conductor size-10 wire may connect to a grounding point of hospital equipment/terminals for improved patient safety.

Figure 13:
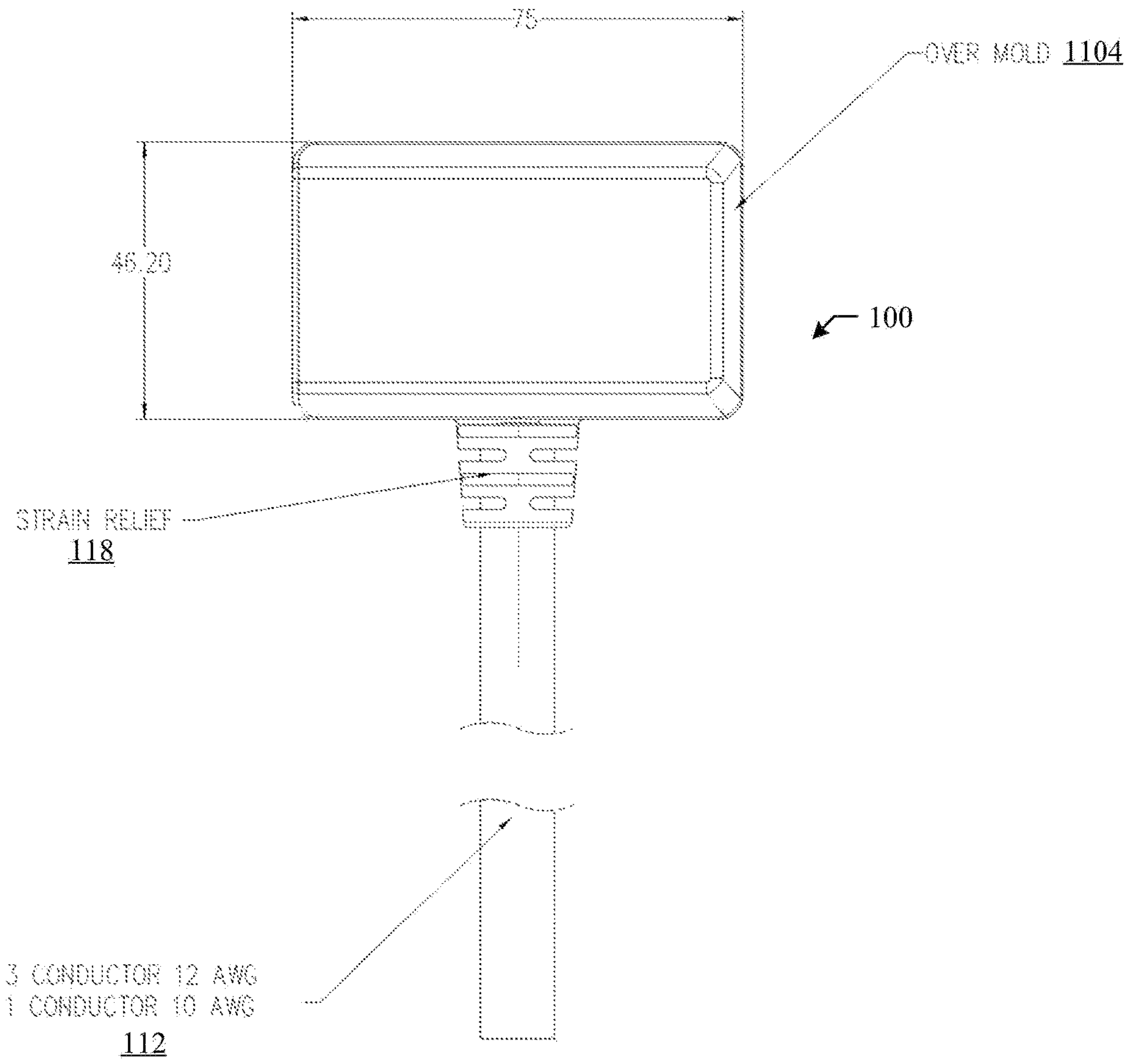
FIG. 13 illustrates an example rear view of the power plug assembly of FIG. 11.

FIG. 13 illustrates an example rear view of the power plug assembly of FIG. 11. As illustrated in FIG. 13, a user may see the logo "TRIPPLITE" from the rear view of the power plug assembly 100. As an example and not by way of limitation, the plug housing 102 may have a width of 75 millimeters and a height of 46.2 millimeters. Although this disclosure describes the plug housing with particular width and height, this disclosure contemplates the plug housing with any suitable width and height.

Figure 14:
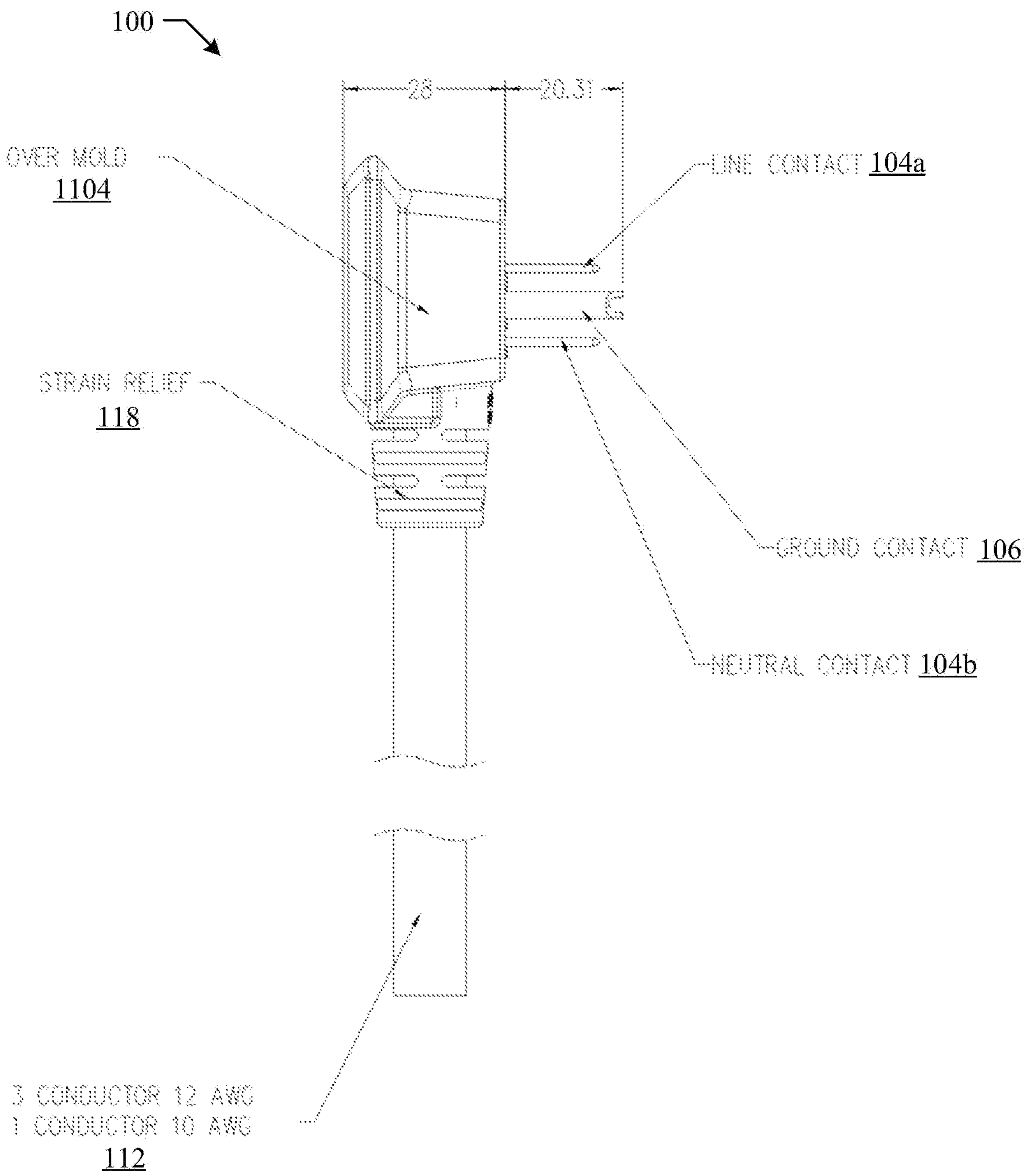
FIG. 14 illustrates an example side view of the power plug assembly of FIG. 11.

FIG. 14 illustrates an example side view of the power plug assembly of FIG. 11. As an example and not by way of limitation, the plug housing 102 may have a depth of 28 millimeters and the ground contact 106 may have a depth of 20.31 millimeters. Although this disclosure describes the plug housing and ground contact with particular depth, this disclosure contemplates the plug housing and ground contact with any suitable depth.

Although this disclosure describes the cord extending from particular side of the power plug assembly, this disclosure contemplates the cord extending from any suitable side or part of the power plug assembly. For example, FIGS. 11-14 illustrate that the cord 112 extends from a long side of plug housing 102. However, in alternative embodiments, the cord 112 may extend from any other side/part such as a short side, a corner, etc.

Figure 15A:
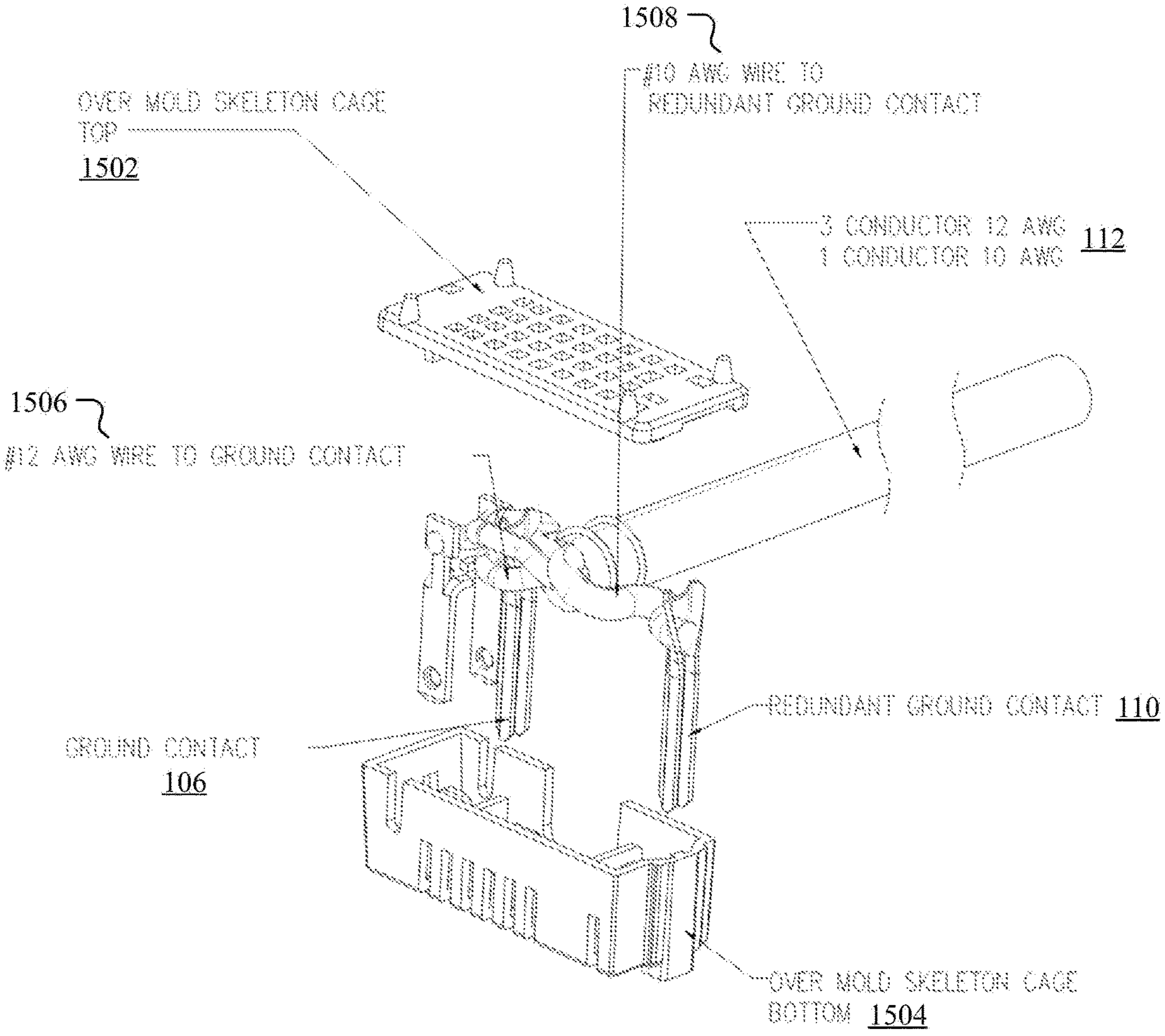
FIGS. 15A-15B illustrate example internal wire connections of the power plug assembly of FIG. 11.
Figure 15B:
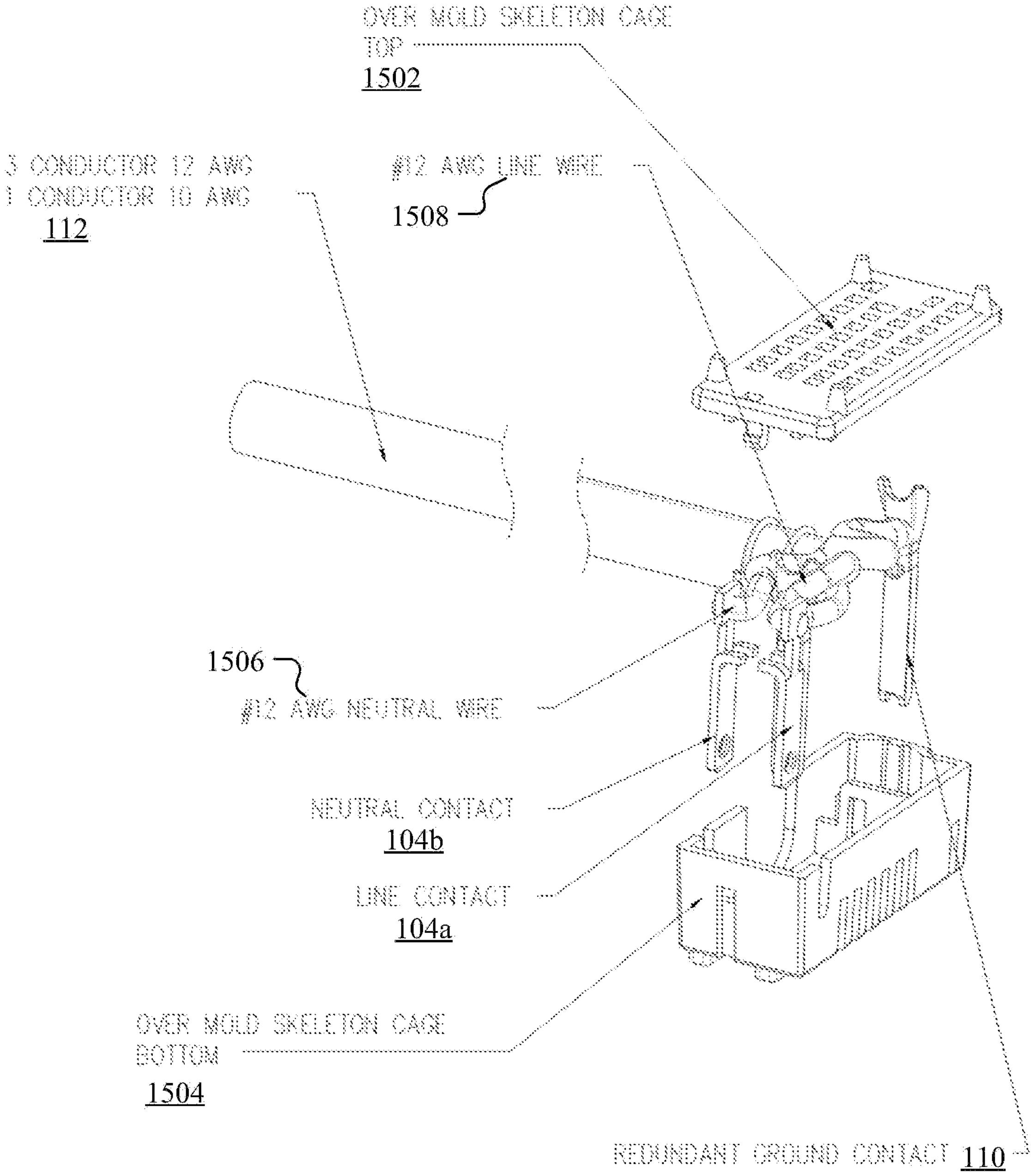

FIGS. 15A-15B illustrate example internal wire connections of the power plug assembly of FIG. 11. As illustrated in FIGS. 15A-15B, the over mold 1104 may be separated to an over mold skeleton cage top 1502 and an over mold skeleton cage bottom 1504. There may be a size-12 AWG wire 1506 connected to the ground contact 106. A size-10 AWG wire 1508 may be connected to the redundant ground contact 110.

Although this disclosure describes two plugs being formed by the terminals in the third embodiment, the power plug assembly 100 may comprise any suitable number (more than two) of plugs being formed by the terminals. As an example and not by way of limitation, the power plug assembly 100 may have a first set of electrical terminals and a first ground terminal forming a first plug, a second set of electrical terminals and a second ground terminal forming a second plug, and a third ground terminal forming a third plug. Accordingly, the power plug assembly 100 may be inserted to an electrical outlet with three receptacles.

In particular embodiments, the power plug assembly 100 may be formed from hospital and/or medical grade plug components, which may be configured to mate with hospital and/or medical grade outlet receptacles. In forming the power plug assembly 100 as a hospital grade plug assembly, it may be configured to provide a larger or stronger gripping force on both the ground terminal and the conductor terminals compared to residential/commercial grade. Thus, the power plug assembly described herein may provide a higher retention in the electrical outlet compared to residential/commercial grade attachment plugs. Moreover, although the NFPA 99-2012, 6.3.3.2 standard for receptacle testing in patient care spaces requires the retention force of the grounding blade (e.g., terminal) of each electrical receptacle (except locking-type receptacles) shall be not less than 115 grams (4 ounces), the power plug assembly 100, as described herein, may include grounding terminals configured to provide, in combination with receptacles of the electrical outlet to which the terminals are inserted, a retention force greater than 115 grams (4 ounces).

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A power plug assembly, comprising:

a plug housing having a front surface, a back surface disposed opposite to the front surface, and a plurality of side surfaces connecting the front surface to the back surface, wherein the plurality of side surfaces include a first side surface that is longer than other side surfaces in the plurality of side surfaces;

a set of electrical terminals protruding from the front surface of the plug housing and configured to be inserted into a first set of electrical apertures of a first receptacle of an electrical outlet to establish an electrical connection;

a first ground terminal protruding from the front surface of the plug housing and configured to be inserted into a first ground aperture of the first receptacle of the electrical outlet to establish a first ground connection;

a second ground terminal protruding from the front surface of the plug housing and configured to be inserted into a second ground aperture of a second receptacle of the electrical outlet to establish a second ground connection;

a non-protruding portion configured to abut a second set of electrical apertures of the second receptacle of the electrical outlet; and a cord enveloping wires that extend from the plug housing via the first side surface, wherein the cord is attached to the first side surface of the plug housing, wherein the first side surface is substantially flat, and wherein the wires are coupled to the set of electrical terminals and the first and second ground terminals.

2. The power plug assembly of claim 1, wherein the front surface from which the set of electrical terminals, the first ground terminal, and the second ground terminal protrude is substantially flat.

3. The power plug assembly of claim 1, wherein the first side is between the front surface and the back surface.

4. A power plug assembly, comprising:

a plug housing having a front surface, a back surface disposed opposite to the front surface, and a plurality of side surfaces connecting the front surface to the back surface, wherein the plurality of side surfaces include a first side surface that is longer than other side surfaces in the plurality of side surfaces;

a set of electrical terminals configured to be inserted into a first set of electrical apertures of a first receptacle of an electrical outlet to establish an electrical connection;

a first ground terminal configured to be inserted into a first ground aperture of the first receptacle of the electrical outlet to establish a first ground connection;

a second ground terminal configured to be inserted into a second ground aperture of a second receptacle of the electrical outlet to establish a second ground connection;

a first wire and a second wire respectively coupled to the set of electrical terminals;

a third wire and a fourth wire respectively coupled to the first ground terminal and the second ground terminal; and a cord enveloping portions of the first wire, the second wire, the third wire, and the fourth wire that extend from the plug housing of the power plug assembly via the first side surface, wherein the first side surface is substantially flat, wherein the first wire, the second wire, and the third wire are 12 gauge wires and the fourth wire is a 10 gauge wire, and wherein the cord is attached to the first side surface of the plug housing.

5. The power plug assembly of claim 4, wherein the front surface is substantially flat.

* * * * *